(12) United States Patent
Marino et al.

(10) Patent No.: US 8,251,225 B2
(45) Date of Patent: Aug. 28, 2012

(54) HARVESTING OF PROCESSED CARBON NANOTUBES

(75) Inventors: John Marino, Silver Spring, MD (US); Gary Giulian, Gaithersburg, MD (US)

(73) Assignee: The United States of America, as represented by The National Institute of Standards and Technology, Washington, DC (US)

( * ) Notice: Subject to any disclaimer, the term of this patent is extended or adjusted under 35 U.S.C. 154(b) by 943 days.

(21) Appl. No.: 12/210,543

(22) Filed: Sep. 15, 2008

(65) Prior Publication Data

US 2009/0101505 A1    Apr. 23, 2009

Related U.S. Application Data

(60) Provisional application No. 60/973,287, filed on Sep. 18, 2007.

(51) Int. Cl.
*B03C 1/30* (2006.01)
(52) U.S. Cl. .............. 209/18; 209/13; 209/40; 944/842; 944/845
(58) Field of Classification Search .......... 977/842–848; 209/13, 17, 18, 38–40; 366/348
See application file for complete search history.

(56) References Cited

U.S. PATENT DOCUMENTS

| | | | |
|---|---|---|---|
| 5,560,898 A * | 10/1996 | Uchida et al. ................. | 423/461 |
| 6,723,299 B1 | 4/2004 | Chen et al. | |
| 6,946,410 B2 | 9/2005 | French et al. | |
| 7,074,310 B2 | 7/2006 | Smalley et al. | |
| 7,344,691 B2 | 3/2008 | Chen et al. | |
| 2002/0048632 A1 * | 4/2002 | Smalley et al. ............... | 427/230 |
| 2007/0196262 A1 | 8/2007 | Billups et al. | |
| 2007/0276131 A1 * | 11/2007 | Ferre et al. ................... | 530/420 |

FOREIGN PATENT DOCUMENTS

WO    WO 2004/024428    3/2004

OTHER PUBLICATIONS

Nano-Mechanical cutting and opening of single wall carbon nanotubes, Chemical Physics Letters 331 (Dec. 2000) 125-131.
International Assessment of Research & Development of Carbon Nanotube Manufacturing and Applications, Eklund et al., (Jun. 2007) i-xi, 1-63.
Giulian et al., 1H, 13C, and 23NA NMR Analysis of Sodium Dodecyl Sulfate (SDS) Trapped in Mechanically Shortened Double Walled Carbon Nanotubes (Oct. 2006).
J. Hilding et al., Dispersion of Carbon Nanotubes in Liquids, J. of Dispersion Science and Technology, vol. 24, No. 1, pp. 1-41 (2003).

* cited by examiner

*Primary Examiner* — J. Christopher Ball
(74) *Attorney, Agent, or Firm* — Berenato & White, LLC

(57) ABSTRACT

A method of harvesting carbon nanotubes (CNTs) is provided. According to this method, CNT bundles, comprising CNTs associated with metallic catalysts and having amorphous carbon coatings are agitated in an aqueous liquid containing a dispersant with free-flowing grit particles to disassociate the CNTs from the metallic catalysts, remove the amorphous carbon of the amorphous carbon coatings and shorten the CNTs via shearing.

25 Claims, 8 Drawing Sheets

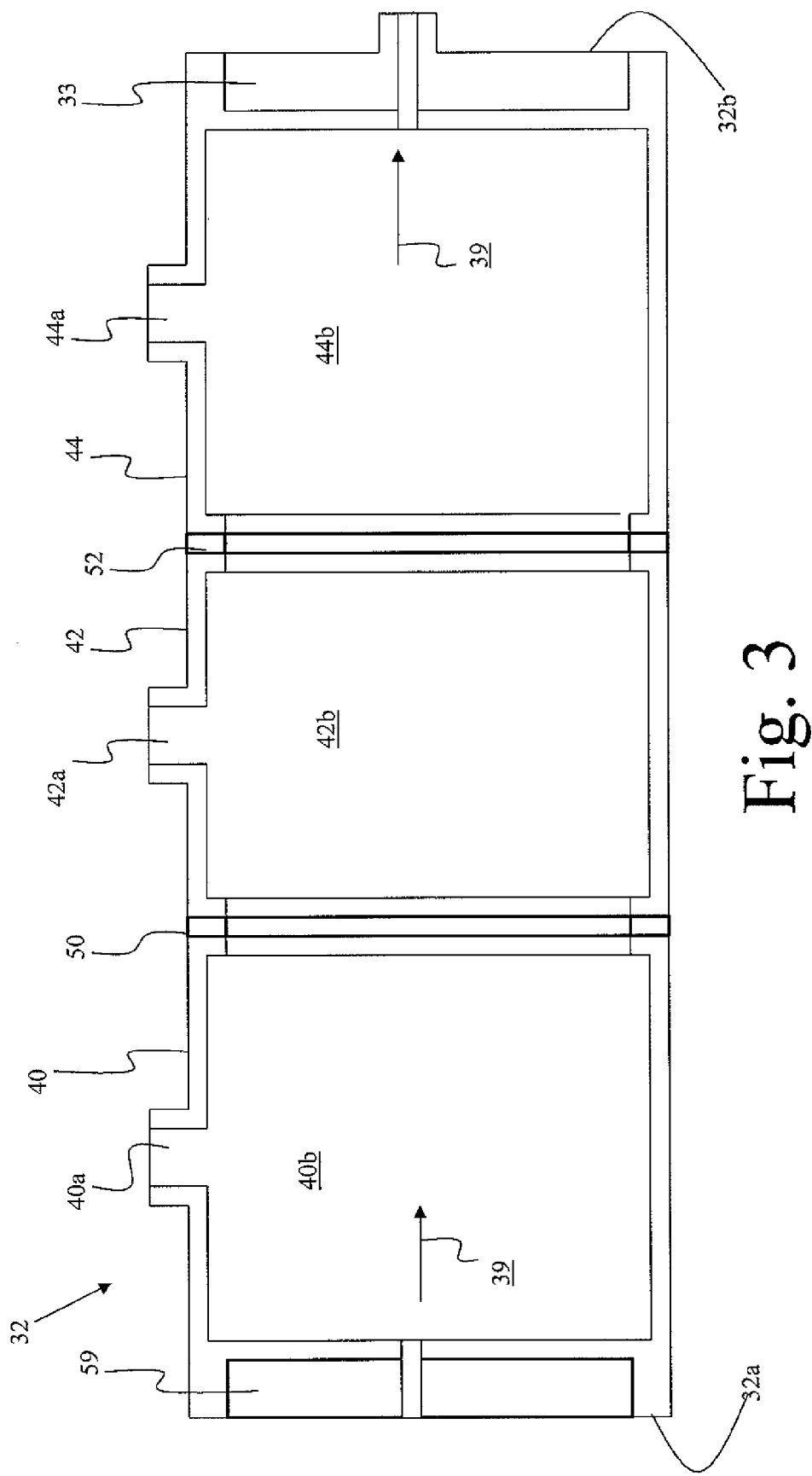

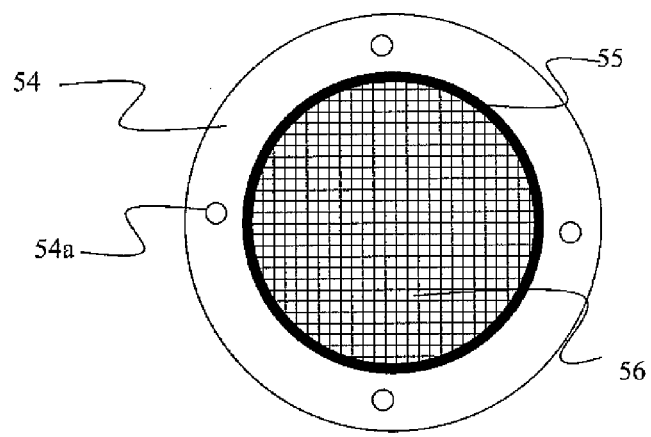
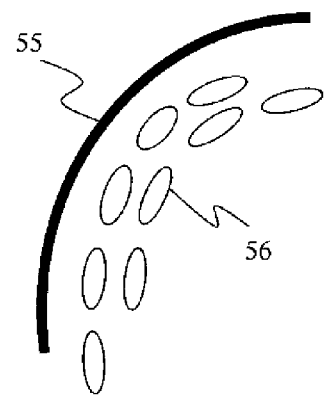
Fig. 4A       Fig. 4B
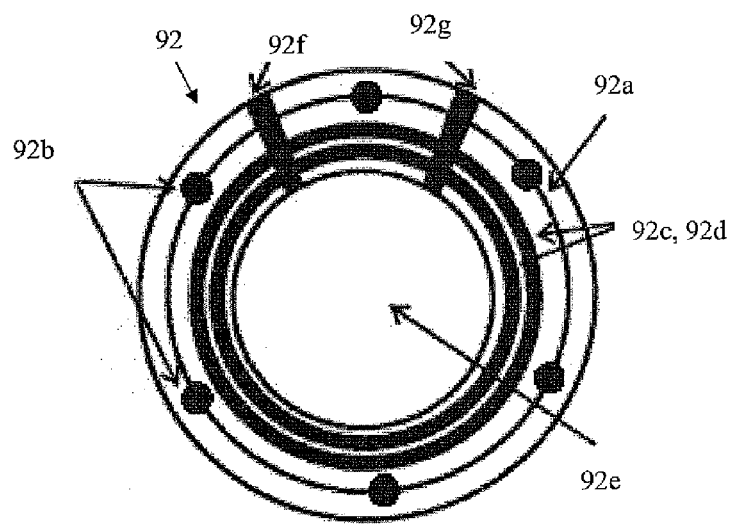
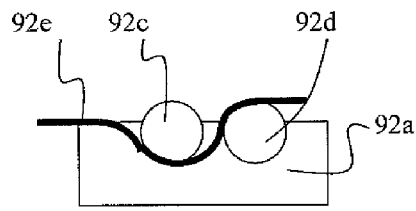
Fig. 7A       Fig. 7B

HARVESTING OF PROCESSED CARBON NANOTUBES

CROSS-REFERENCE TO RELATED PATENT APPLICATIONS

This application claims the benefit of priority of provisional application 60/973,287 filed in the U.S. Patent & Trademark Office on Sep. 18, 2007, the disclosure of which is incorporated herein by reference.

ORIGIN OF THE INVENTION

The invention described herein was made by both employees of the United States Government and United States Government Contractors. The United States Government has an ownership interest in this invention.

FIELD OF THE INVENTION

The present invention relates to harvesting processed carbon nanotubes, and more particularly processes that involve the descaling, debundling, catalyst removal and/or size-sorting of carbon nanotubes.

BACKGROUND OF THE INVENTION

Carbon nanotubes (CNT) are nanoscale structures that have attracted much interest throughout various technologies for their exceptional electrical, magnetic, mechanical, and thermal properties. CNTs are particularly strong materials with high tensile strength and elastic modulus. Aligned CNTs are good thermal conductors along their axial length and good insulators lateral to their axes.

Given the unique combination of properties possessed by CNTs, there have been an ever increasing number of potential applications for CNTs. Electronic, optic and optoelectronic applications include, for example, field emission devices (FEDs), composites for electromagnetic interference shielding and electrostatic discharge protection, additives for battery and supercapacitor electrodes, and fuel cell electrodes.

Generally, a CNT is a hexagonal network or lattice of carbon atoms that appears as an elongated sheet rolled into an elongated, seamless cylinder. The cylinder may have a diameter, for example, on the order of a few nanometers, and a length up to several micrometers. The cylinder may consist of a single wall or multiple concentric walls or shells tightly packed with one another and attracted to one another by van der Waals forces. These CNTs are respectively referred to as single-wall CNTs (or SWCNTs) and multi-wall CNTs (or MWCNTs).

There are a variety of different methods for fabricating CNTs. A common feature of these methods is the use of a transition metal-based nanoparticle that serves as a catalyst or seed for the growth of the carbon cylindrical body. The nanoparticle seeds are exposed to gaseous carbon or a hydrocarbon source which deposits carbon on the particle surface and builds upon itself to generate the carbon tubular body. The particular technique employed for generating and depositing the carbon varies. Known techniques include chemical vapor deposition, pulsed laser vaporization, radio frequency plasma, and electric arc discharge. The characterization of the carbon deposition as either a mono- or multi-walled structure will depend largely on the size of the transition metal-based nanoparticle. Larger nanoparticles tend to favor MWCNTs. It should be understood that the present invention is not limited to, and may be practiced in combination with, a variety of these synthesis techniques and nanostructures.

Conventional CNT synthesis techniques as described above do not produce discrete, catalyst-free tubes. Rather, the resulting nanostructure usually is a bundle of tubes intertwined together and connected to their respective metal catalysts. Further, amorphous carbon shells coat the outside of the tubes. Many of the commercial and potential applications discussed above require that the carbon nanotubes be cleaned of their amorphous carbon shell, debundled from other intertwined tubes, separated from their metallic catalysts and/or shortened. The separation of the tubes from their metallic catalysts and the removal of the amorphous carbon, in particular on large scales, are significant barriers to harvesting a relatively pure population of CNTs suitable for large scale applications.

The current state of the art for purifying CNTs is to use combinations of organic dispersants, high power ultra sonication, strong mineral acids, and/or oxidizers to treat the CNTS. These purification processes can destroy and/or cause excessive damage to the CNTS. In particular, it has been estimated using these state-of-the-art techniques to debundle, purify and shorten CNTs may damage or destroy up to 90 percent of the CNTs, In this regard, chiral semi-conducting CNTs and/or shortened tubes (<500 nm long) are particularly sensitive. High-power sonification, for example, has been found to blow-out the side walls of the CNTS. Strong acids (e.g., nitric and sulfuric acids), oxidizers (e.g., hydrogen peroxide), and organic solvents (e.g., tetrahydrofuran, methyl ethyl ketone, and methyl chloride) produce significant harmful waste, raise worker safety and toxicity concerns, and in some instances have been found to chemically alter the CNTs. An alternative mechanical-based approach that applies a "ball-milling" process to debundle and shorten CNTs has also been reported but has not to date been successfully implemented as a practical, scalable method. This is because ball milling has been found to be one of the most destructive methods for processing CNTs. Because of the above-described problems, established purifying methodologies are not scalable to high industrial rates.

Even after the CNTs have been debundled and debulked to extricate the individual tubes from their intertwined state, the CNTs must be separated from their catalysts and amorphous carbon before being suitable for use in many commercial and theoretical applications. Current state of the art separation methods include high-speed centrifugation, filtration (paper, glass, filter, membrane, gel), and chromatography (column and HPLC). Common problems plaguing these state-of-the-art techniques are limited throughput capability and scalability due to CNT aggregation and filter clogging.

In view of the increasing demand for the large-scale production of processed CNTs so as to satisfy the various potential applications of CNTs, there is a need in the art for a process for harvesting CNTs in a manner that much more robust and scalable while being much less destructive to the CNTs than the above-discussed known techniques.

SUMMARY OF THE INVENTION

In accordance with the purposes of the invention as embodied and broadly described herein, a first aspect of the invention provides a method of harvesting carbon nanotubes (CNTs). According to this method, CNT bundles, comprising CNTs associated with metallic catalysts and having amorphous carbon coatings are agitated in an aqueous liquid containing a dispersant with free-flowing grit particles to disassociate the CNTs from the metallic catalysts, remove the amorphous carbon of the amorphous carbon coatings and shorten the CNTs via shearing along the radial axis of the tubes.

A second aspect of the invention provides a method of harvesting CNTs, in which mixtures of CNTs, residual metallic catalysts and amorphous carbon are subjected to a density gradient, magnetic phase separation in which stratified, resolved layers of the CNTs, the amorphous carbon, and the metallic catalysts are generated that allow for separation.

A third aspect of the invention provides a method of harvesting carbon nanotubes, in which a liquid containing a dispersant, carbon nanotubes, and amorphous carbon of a coating is subjected to a colloidal electrophoresis operation in a rotating apparatus containing at least one rotating membrane sized to permit the passage of the amorphous carbon, but to intercept and block the passage of the carbon nanotubes.

Other aspects of the invention, including apparatus, systems, methods, and the like which constitute part of the invention, will become more apparent upon reading the following detailed description of the exemplary embodiments and viewing the drawings.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings:

FIG. 3 is a partially transparent, sectional view of tumbler for carrying out a grit-shearing step according to an embodiment of the invention;

FIG. 4A is a plan view of a filter for the tumbler of FIG. 3;

FIG. 4B is an enlarged, fragmented view of a filter according to an alternative embodiment of the invention;

FIG. 7A is an end view of a filter cassette for the electrophoresis apparatus of FIG. 6;

FIG. 7B is a fragmented, side-sectional view of the filter cassette of FIG. 7A.

DETAILED DESCRIPTION OF EXEMPLARY EMBODIMENTS OF THE INVENTION

Figure 1:
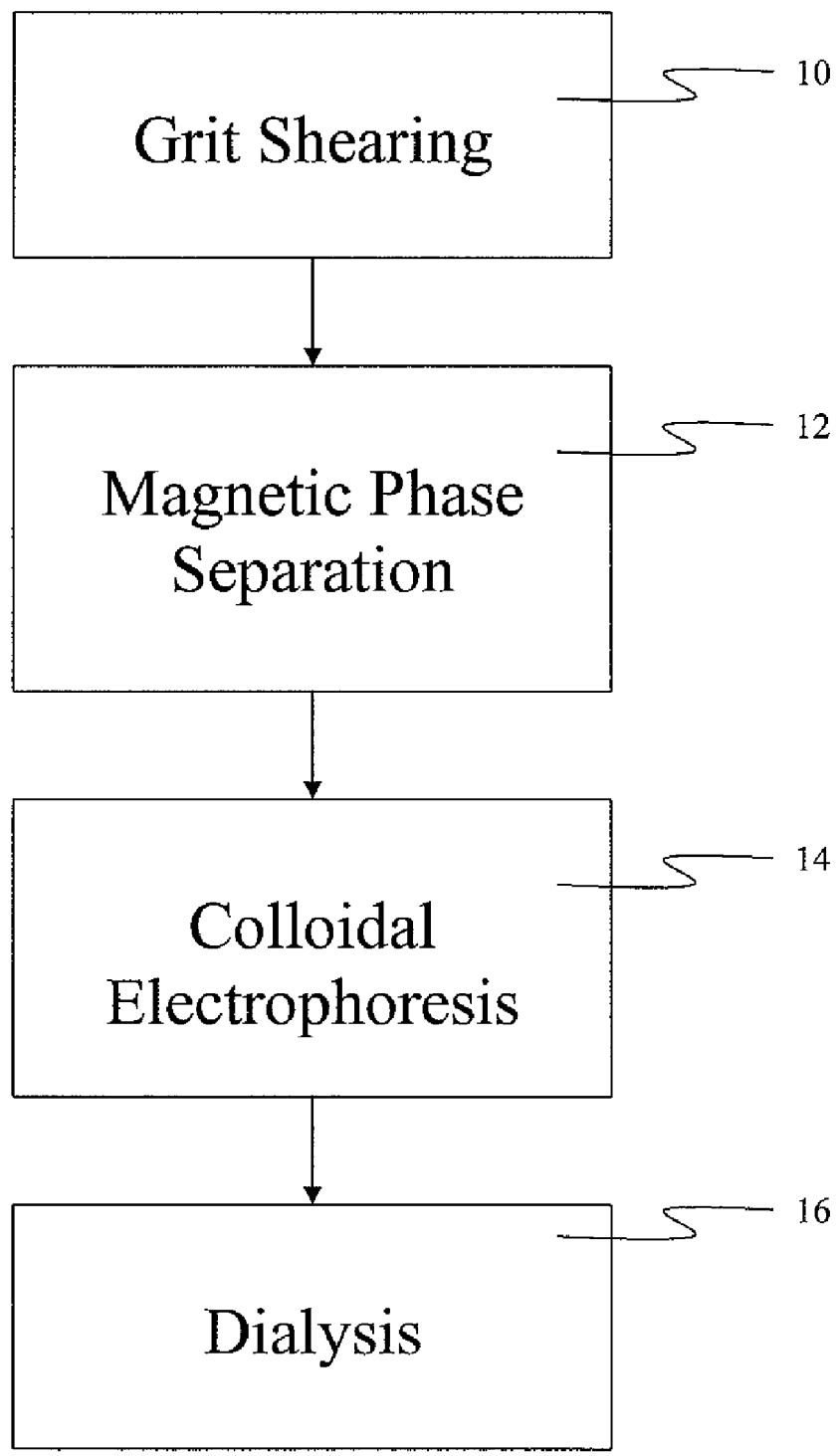
FIG. 1 is a flow chart of a harvesting process for carrying out an embodiment of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the exemplary embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

Figures 1A, 1B:
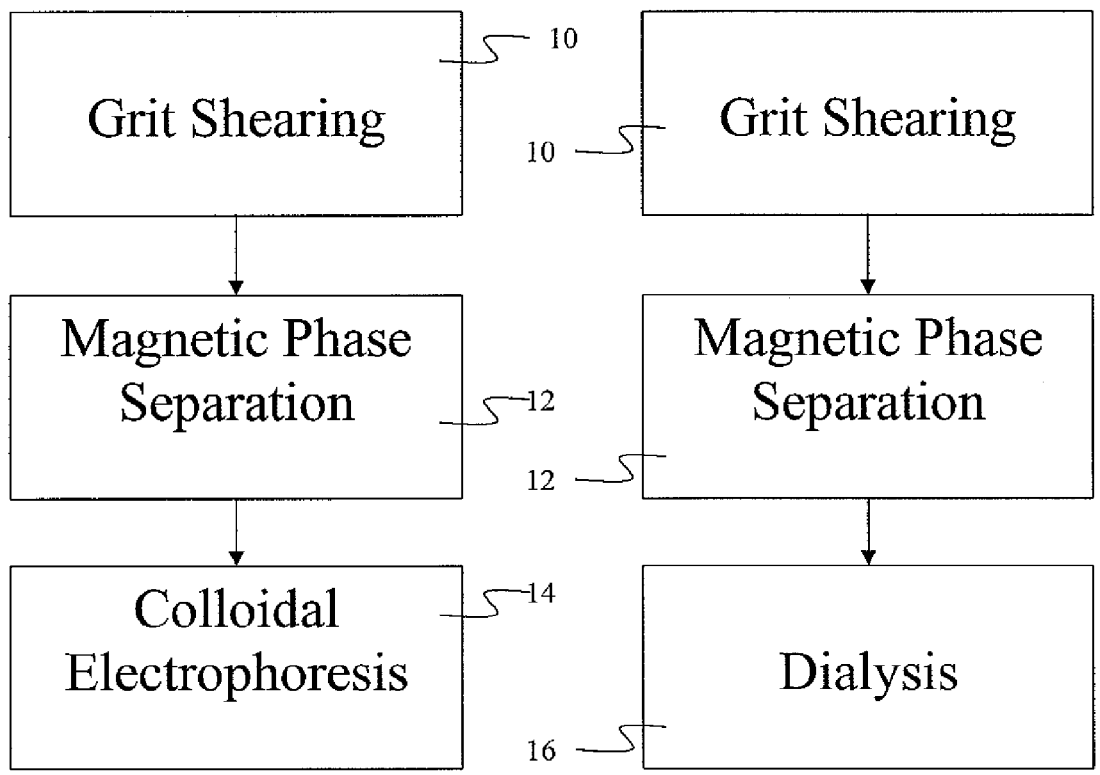
FIG. 1A is a flow chart of a harvesting process according to an alternative embodiment of the present invention.
FIG. 1B is a flow chart of another harvesting process according to another alternative embodiment of the present invention.
Figure 1C:
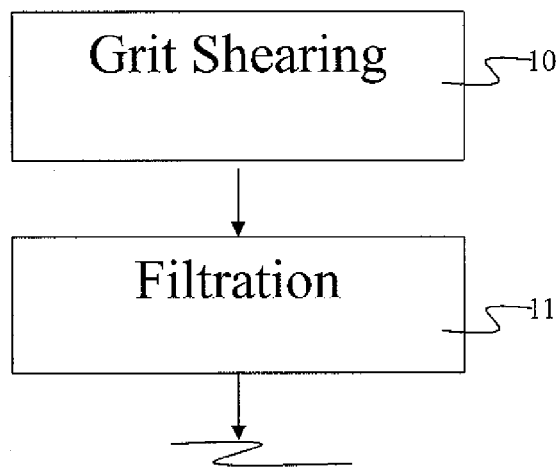
FIG. 1C is a partial flow chart of a modification that may be applied to the harvesting processes of FIGS. 1, 1A, and 1B.

FIG. 1 depicts a flowchart including steps for harvesting (CNTs) according to an embodiment of the invention. These steps and alternatives will be described below in great detail. Generally, the steps include a grit-shearing stage 10 for debundling, decoating, and shortening the CNTs, a magnetic phase separation stage 12, an electrophoretically driven filtration stage 14, and a dialysis stage 16. It should be understood that the scope of the present invention may include additional or fewer steps to those shown in FIG. 1. For example, as shown in FIGS. 1A and 1B, respectively, the dialysis stage 16 or the electrophoretically driven filtration stage 14 may be omitted. As shown in FIG. 1C, additional stages may be added to the embodied processes, such as an osmotic pressure driven filtration stage 11, discussed below. Additional, alternative and known procedures and operations can be substituted for or supplement the stages shown in FIGS. 1, 1A, 1B, and 1C.

Figure 2:
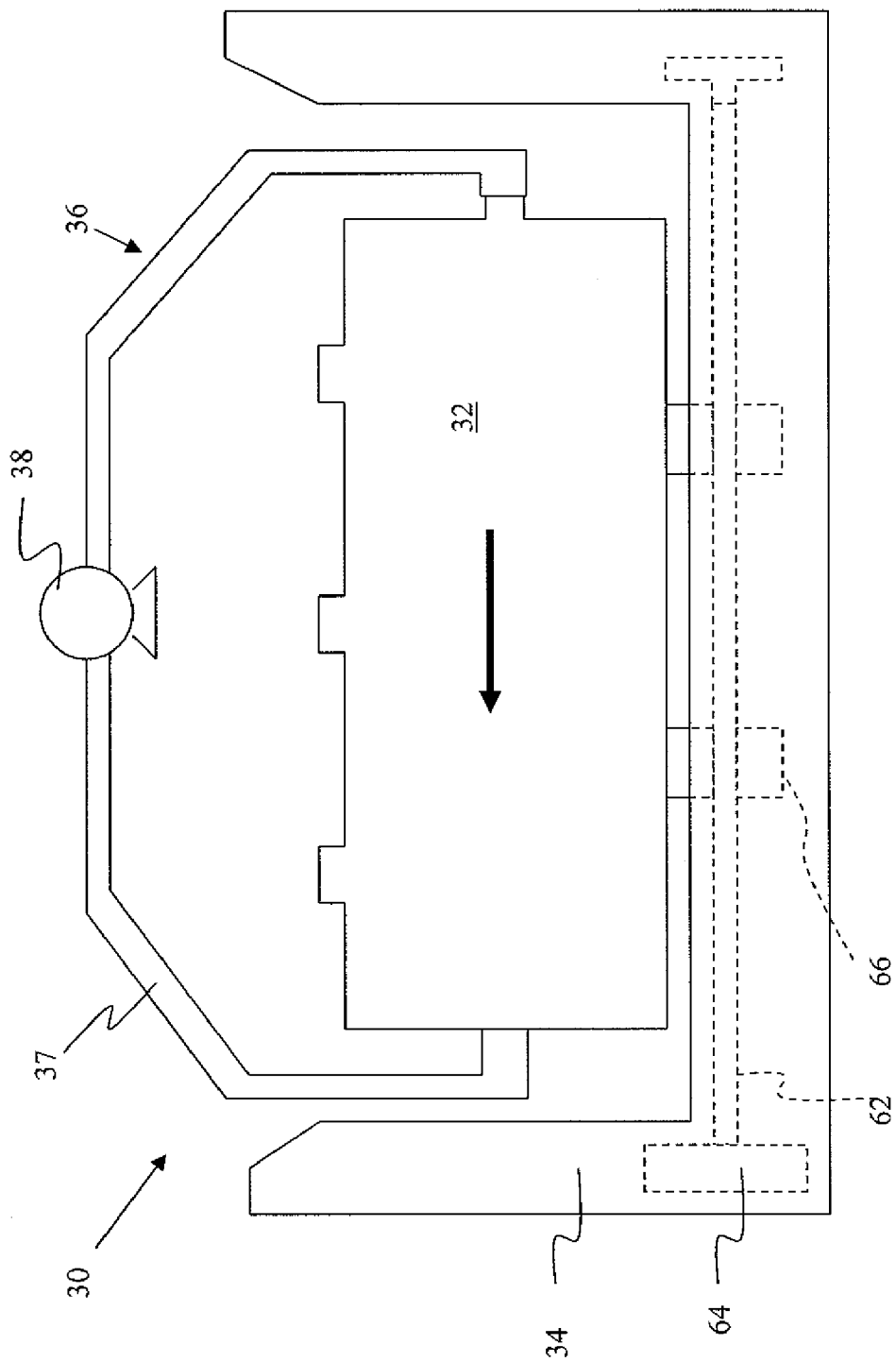
FIG. 2 is an overview of a system for carrying out a grit-shearing step according to an embodiment of the invention.

FIG. 2 provides an overall general view a system for carrying out the grit-shearing stage 10. The system of FIG. 2 is generally designated by reference numeral 30, and includes a tumbler 32, a rotating mechanism 34 for imparting rotational movement to the tumbler 32 about its longitudinal axis, and a pump assembly 36.

Referring more particularly to FIG. 3, the tumbler 32 has an upstream end 32a and a downstream end 32b. The tumbler 32 may comprise a plurality of cylindrical segments 40, 42, 44. In the illustrated embodiment, first cylindrical segment 40 is proximal the upstream end 32a, and third cylindrical segment 44 is proximal the downstream end 32b. The second cylindrical segment 42 is interposed between the first and third cylindrical segments 40, 44. The cylindrical segments 40, 42, 44 may be attachable and detachable from one another using, for example, known fasteners, such as screws or bolts inserted into aligned apertures in adjacent flanges of the cylindrical segments. Alternatively, the cylindrical segments 40, 42, 44 may be permanently joined or formed together as a unitary structure.

The cylindrical segments 40, 42, 44 each comprise an annular outer wall having an interior surface defining a compartment (or zone) 40b, 42b, 44b. The outer walls of the cylindrical segments 40, 42, 44 may be formed of relatively thick walls of plastic, glass, ceramic, or other material. Plastic such as polycarbonate is particularly useful because of its transparency and physical properties. At least one port 40a, 42a, 44a extends through the outer wall of cylindrical segment 40, 42, 44, respectively, for allowing the introduction and removal of materials into the respective compartments 40b, 42b, 44b of the segments 40, 42, 44. Although not shown, each port 40a, 42a, 44a is provided with a respective removable cap for creating a fluid-tight seal.

The cylindrical segments 40, 42, 44 have identical outer diameters, and identical inner diameters defining their respective compartments 40b, 42b, 44b. The radial and length dimensions of the segments 40, 42, 44 and other equipment components discussed herein may be selected based on several factors, including the desired scale of the operation. For the purposes of experiments carried out by the inventors, a tumbler was used having a length maximum of 5.56 inches (14.12 cm) overall and a maximum diameter of 2.81 inches (7.14 cm) outer diameter (OD). Clearly larger dimensions may be desirable for large or industrial scale operations.

A first filter cassette 50 is interposed between the first cylindrical segment 40 and second cylindrical segment 42 of the tumbler 32. A plan view of filter cassette 50 is shown in FIG. 4A. As shown in FIG. 4A, the filter cassette 50 includes an annular body element 54 receivable between flanges of cylindrical segments 40 and 42. A groove machined into the inner rim of body element 54 receives an O-ring 55 for establishing a fluid-tight seal at an interface of the segment walls. The central region of the first filter cassette 50 includes a mesh 56. Mesh 56 may be mounted to the body element 54 as discussed below in connection with FIG. 7B.

Filter body 54 has holes or apertures 54a for receiving a bolt, screw, or other fastener to mount the filter cassette 50 between the flanges of segments 40, 42. A second filter cassette 52 is similarly interposed between the second and third cylindrical segments 42, 44. Fewer or additional filter cassettes may be included in the tumbler 32. Alternative mating arrangements may be used for mounting the filter cassettes 50, 52 to the segments 40, 42, 44. For example, segment 40 and/or 42 may include a shoulder for receiving the outer rim of the first filter 50. The mesh 56 may be made of any suitable material, such as nylon mesh.

The pore dimensions of the mesh 56 of the first filter cassette 50 are sized to permit fluid, CNTs, catalytic particles, and amorphous carbon (from the CNT coating) separated from CNT bundles deposited in compartment 40b to flow through the mesh 56 of the first filter cassette 50 into compartment 42b, while preventing flow of a substantial portion of the larger grit particles, that is, substantially retaining the grit particles in the chamber 40b of the first cylindrical segment 40. The pore dimensions of the mesh of the second filter 52 may be smaller than the pore dimensions of the mesh 56 of the first filter 50 to collect in the second compartment 42b grit particles and bundle formations small enough to have passed with the fluid flow through the first filter cassette 50. The mesh pore dimensions of the filters 50, 52 may be in a range of, for example, 50 nm to 100 microns. According to one exemplary embodiment, the meshes 56 of the first and second filters 50, 52 have pore dimensions of 50 microns and 5 microns, respectively. According to another exemplary embodiment, another mesh (not shown) of about 1 micron is added downstream relative to the second filter 52. Nylon meshes are available, for example, through Small Parts, Inc. of Miramar, Fla. An exemplary commercial 50 micron mesh sold by Small Parts, Inc. under part number CMN-0053-A is described as 40 micron thread diameter with a 31 percent open area. An exemplary 1 micron commercial mesh is sold by Small Parts, Inc. under parts number CMN-LP001001-06.

A magnetic element 59 is situated at one end of the tumbler 32, adjacent the upstream end of the first cylindrical segment 40. As will be explained in further detail below, the magnetic element 59 should have an attractive force sufficient to attract a substantial portion of the metallic catalysts separated from the CNT bundles during the grit shearing step 10. The magnetic element 59 may comprise one or more neo-magnets, although other static and electromagnetic elements may be used instead of or in addition to the neo-magnet(s). An exemplary commercial 2½"×¼" neo-magnet (NdFeB, Grade N42) is sold by K&J Magnetics, Inc. of Jamison, Pa. An end closure 33 is situated at the opposite end of the tumbler 32. The magnetic element 59 and the end closure 33 have central bores creating part of the fluid pathway for the flow of fluid pumped by the pump assembly 36.

In an exemplary implementation, CNT bundles are introduced into the compartment 40b of the first cylindrical segment 40 through port 40a. The input material may be derive from any production source of CNTs, for example, chemical vapor deposition, pulsed laser vaporization, radio frequency plasma, or electric arc discharge, and can be applied to sources of CNTs with any level of initial purity, aggregate/bundle state and size distribution. The CNTs introduced into the portion 40a may be single-wall or multi-wall structures. Commercial suppliers of CNTs include, for example, Unidym, Inc. (formerly Carbon Nanotechnologies, Inc. (CNI)) of Menlo Park, Calif., Carbolex, Inc. of Broomall, Pa., Nanolab, Inc. of Newton, Mass., and SouthWest NanoTechnologies Inc. of Norman, Okla., Also introduced through port 40a are grit particles and an aqueous medium containing at least one dispersant (also referred to as a detergent). Exemplary grit particles are silicon carbide and diamond. Graves Company of Pompano Beach, Fla. is an example of a commercial supplier of such grit particles. The size of the grit particles may vary. For a 25:1 weight ratio of shearing particles to CNTs—60/90, 120/220, 500/600 silicon carbide grit and 100,000 diamond grit have been practiced. The diameter size of the silicon carbide grit particles are as follows:

| Grit Size | Average diameter (microns) |
| --- | --- |
| 60 | 254 μm |
| 90 | 144 μm |
| 120 | 102 μm |
| 220 | 63 μm |
| 500 | 20 μm |
| 600 | 15 μm |
| 100,000 (diamond) | 0.25 μm |

(http://stellafane.org/atm/atm_mirror_ref/atm_grit.htm#Grit%20Size%20) and (http://www.cabbingmachines.com.polishes.shtml).

A combination of different size shearing particles may be used, as offered by Graves Company with its PRO-GRIT kit. The grit particles are preferably substantially free-flowing, that is, the particles are not bound to a solid stationary substrate as in the case of sandpaper, so that the particles may flow separately from one another in the tumbler 32 when agitated, e.g., rotated. The grit particles may be spherical or non-spherical, coarse or fine, or grain-like.

In a particularly exemplary embodiment of the invention, the dispersant is introduced into each of chambers 40b, 42b, and 44b. The dispersant may be anionic, cationic, non-ionic, and/or a bile salt, for example. Anionic dispersants include sodium dodecyl sulfate (SDS), benzylated SDS, dodecylbenzenesulfonic acid (DBS), and/or lithium dodecyl sulfate (LDS). SDS is available from various suppliers, including Sigma-Aldrich of St. Louis Mo. TCI America of Portland Oreg. is a supplier of DBS. Cationic dispersants include trimethylhexadecylammonium chloride supplied by, e.g., Sigma-Aldrich. Triton™-X100 of Sigma-Aldrich is an example of a non-ionic dispersant, while sodium cholate and deoxycholate (also supplied by Sigma-Adrich) are examples of bile salt dispersants. Commercial detergent blends such as NanoSperse AQ™ (of Nanolab Inc. of Boston, Mass.) also may be used. Other useful dispersants are described in U.S. Pat. No. 7,074,310, which is incorporated herein by reference for its list of dispersants.

In an exemplary embodiment, a 10 percent weight/volume solution of SDS in water has been found to be particularly useful for the tumbler 32. According to one useful embodiment, a 35:1 volume/weight ratio of 10% SDS to CNTs was used.

Dispersants are capable of readily dispersing CNTs in aqueous media to provide colloidal CNTs. WO 2004/024428 explains that many dispersants when used with an ultrasonication process are capable of providing stable dispersions of carbon nanotubes which are less breakable in processing operations such as sonification. The dispersant coating stabilizes the CNTs by forming a "double layer" or a micellular arrangement of dispersant molecules around CNTs in aqueous phase. The dispersant coating has also been reported to prevent re-aggregation or re-bundling of the CNTs. See U.S. Pat. No. 7,074,310.

While not wishing to necessarily be bound by any theory, in the context of exemplary embodiments of the present invention it is believed that dispersants such as SDS encapsulate the grit particles and the CNTs by either bonding via van der Waals forces or forming a micelle, and that the encapsulate softens or cushions the shearing blow of the grit particles against the CNT bundles. It is believed that this phenomenon largely contributes to the high yields achievable by practicing embodiments of the present invention. Generally, increasing the ratio of dispersant in the aqueous medium will increase viscosity and softening or cushioning effect on the grit particles. High dispersant concentrations may require that the tumbler 32 be operated for longer processing times to attain adequate shearing.

The CNT bundles, aqueous medium, and grit particles may be introduced through the port 40a into compartment 40b in any sequence, or combined together in any combination before being introduced through the port 40a. The compartments 40b, 42b, 44b of the cylindrical segments 40, 42, and 44 may be partially filled with the aqueous medium and/or detergent (e.g., SDS) before introducing the CNT bundles.

The rotating mechanism or system 34 operates to rotate the tumbler 32 about its longitudinal axis. In the illustrated embodiment, rotating mechanism 34 includes a platform 60 that may be made of rubber, metal, plastic, or any other suitable material. The rotating mechanism 34 includes a pair of shafts 62 and a motor 64 or motors for rotating the shafts 62 about their longitudinal axes. The motor 64 may be a conventional electric motor or any other suitable motor. A plurality of rollers 66 are spaced along the length of each shaft 62 and support or otherwise contact the tumbler 32. In the illustrated embodiment, a roller 66 is provided for each of the cylindrical segments 40, 42, 44. The rollers 66 rotate with the shafts 62. The rollers 66 may be made of rubber materials capable of transmitting the rotational movement of the shafts 62 to the tumbler 32, causing the tumbler 32 to rotate about its cylindrical axis.

The pump assembly 36 includes a conduit 37 connecting the upstream and downstream ends of 32a, 32b of the tumbler 32. A pump 38 is situated along the conduit 37. Electrical connections between stationary and rotating parts of apparatus described herein can be implemented using rotating electrical connectors, such as supplied by Mercotac, Inc. of Carlsbad, Calif. According to an experimental embodiment, the fluid connections between the conduit 37 and ends 32A, 32B of tumbler 32 are made through threaded reducing coupling port with ¼ inch NPT, such as supplied by US Plastics of Lima, Ohio which connect to ⅛ inch Tygon™ tubing at the end of the tumblers and to an in-line small re-circulating pump to create a close loop system that rotates with the tumbler 32. In-line pumping can be implemented using a model TCS M200 micro pump, such as supplied by TCS Micro Pumps Limited of Kent, England. A rotating electrical connector using a rotating electrical connector, such as supplied by Mercotac, Inc. of Carlsbad, Calif. provides power to the internal micro-pumps within the tumbler assembly.

The pump system 36 exerts a force perpendicular to the mesh surface to help drive smaller particles such as CNTs through the mesh. The pumped liquid flow along the long-axis of the horizontally arranged tumbler tube and external tubing connecting the pump and ported end caps of the tumbler core represent a closed-loop system. All liquids and dispersed particles are confined within the tumbler device and pump/tubing assembly. It should be understood that alternative systems and set-ups may be used in place of the pump assembly 36 for driving flow through the meshes. For example, the pump assembly may be replaced with an Archemedes screw. Gravitational force created by tilting the tumbler 32 at an angle, e.g., 4-10 degrees from horizontal, may be used instead of or in combination with the pump assembly and/or Archemedes screw for micron-scale particle (CNT) size separation.

Rotation of the tumbler 32 causes the grit particles, which are believed to be encapsulated with SDS or other dispersant, to impact against the CNT bundles. The grit particles shear the CNTs of the bundles from one another in an operation known as debundling. The grit particles also removes the amorphous carbon shells in an operation known as descaling, and shorten the carbon nanotubes in an operation known as shearing. Generally, carbon nanotubes in the CNT bundles may have lengths on the order of 1 to 10 microns in length when introduced into tumbler 32. These CNT lengths may be shortened to, for example, lengths of 10 to 1,000 nm during descaling/shearing in the tumbler depending on the processing time (number of rotations of tumbler 32), and the diameter and type of grit particle. In general, larger grit shearing particles and those with a reduced hardness factor (silicon carbide reduced hardness compared to diamond) will result in longer CNT tube lengths when the number of rotations and weight ratios of CNTs vs shearing particles remain constant. In addition to hardness, grit particle morphology can also result in differences in processing outcomes. For example, diamond powder is considered much "sharper" and to have a more regular cutting surface than silicon carbide resulting in more of a descaling effect with diamond powder compared to debundling with silicon carbide.

As the tumbler 32 debundles/descales the CNTs, the CNTs are also separated from the catalyst seeds of the CNT bundles. These metallic catalyst seeds are attracted by the magnetic element 59 to the upstream end 32a of the tumbler, and mostly remain in compartment 40b. Bundled tubes and grit too large to pass through the first filter 50b also largely remain in compartment 40b. Typically a small percentage of bundled carbon nanotubes are small enough to pass through mesh 56 of the first filter 50 into the second cylindrical segment 42, as do catalyst particles that are not magnetically bound to the magnetic element 59. The debundled CNTs and amorphous coating are not magnetically attracted to magnetic element 59, and consequently flow downstream through the mesh 56 of the first filter cartridge 50 into the second compartment 42b of cylindrical segment 42. Depending upon the respective pore sizes of the meshes 56 of the filters 50, 52, etc., the CNTs are separated into different compartments 42b, 44b, etc. based on size. It is preferred that downstream meshes have equal or smaller pore sizes than upstream meshes. According to one exemplary embodiment, three meshes with pore sizes of 50 micron, 5 micron, and 1 micron are used. In this embodiment, the metallic catalyst seeds and shearing particles, which are significantly denser than the CNTs and strongly attracted to the magnetic element 59 to the upstream end 32*a* of the tumbler, mostly remain in compartment 40*b* of the rotating tumbler 32. The distribution of the lower density CNTs in the recirculated pumping system is restricted by the pore size and volume in each of the filtered zones. All CNTs with hydrodynamic sizes greater than the pore size of the intermediate filter will be retained in that zone. For example, a first 50 micron mesh filter restricts the bulk of the 120/220 grit [102/62 μm] silicon carbide grit and large CNT bundles. These larger CNT bundles do not pass through the first filter, but continued to be debundled and sheared until they have a smaller hydrodynamic size. The 5 micron filter traps the rest of the larger CNT aggregates, grit, etc. The third fraction <1 micron filtered contains the shortened CNTs as well as the finest amorphous grit residue. By adjusting the spacing between the filter rings approximately 80 to 90% of the closed volume of the system is partitioned for particles <1 micron. In this configuration, the smallest particles can recirculate but in practice are concentrated in compartment 44*b*.

One advantage of this exemplary embodiment is that the rotating motion of the filter cartridges 50, 52 is self-cleaning to prevent clogging at the meshes 56. In the tumbler 32, the filter meshes rotate as the pump (and/or gravitational forces) flowing liquid through the tumbler 32 applies a relatively low pressure against the upstream face of the filter meshes 56. The applied low pressure serves to force a portion of the fluid and entrained particles through the mesh 56. Viscous drag causes the entrained particles (including the CNTs) to move at a slower rotational speed than the rotating mesh 56. Consequently, particles, even those smaller than the pore hydrodynamic radius, are in many instances rejected by the rotating mesh. Provision of the mesh with a relatively small thickness, 5 to 10 microns, allows those particles unable to make the rapid transition through the mesh to be washed back into the bulk fluid upstream from the filter, rather than clogging the filter. As discussed in greater detail below, chemically inert agitation spheres or particles may be placed in one or more of compartments 40*b*, 42*b*, 44*b* to collide with the mesh 56, pulverizing or loosening small particles adherent to the mesh surface.

The tumbler 32 may be operated at a speed of, for example, 50 to 100 rpm, although the operating speed will vary depending upon the size of the tumbler 32, the operating conditions, and the nature of the CNT starting material, the desired length of the resulting CNTs, and the dispersant concentration. In the case of SDS dispersant, the temperature of the medium inside the compartments 40*b*, 42*b*, 44*b* may be maintained, for example, at or below about 10-12° C., such as at about 4° C. Although not limited, the temperature is preferably above 0° C. for SDS. Generally, the temperature should be above the freezing point of the aqueous-dispersant medium, but sufficiently low to increase viscosity.

The pump flow rate is preferably fairly low, but sufficient to reduce or prevent clogging. The pump flow rate may be, for example, about 50-100 ml/min for the microscale (Nylon) filters and 1-50 ml/min for nanoscale filters (PTCE), although the rate may deviate outside of this range depending on factors such as pore size and scale of operation. The flow rate will depend on the filter porosity (pore size), particle size and total recirculating system volume. A single experimental pump has a free flow rate in the 500-700 ml/min, but in practice once hooked up to nanoscale filters the rate drops to <1-10 ml/min. To increase flow rates several (2 or 3) pumps can be attached in series to achieve flow rates in the 1-50 ml/min range for the nanoscale filters (PTCE) and the 50-100 ml/min range for the microscale (Nylon) filters. As with the tumbler speed, the duration for which the tumbling is carried will vary depending on the properties of starting CNT material and shearing material. Those properties include the aggregation state of the CNTs (lower grade, heavily bundled CNTs will take longer than high grade, better dispersed CNTs), and the hardness and diameter of the shearing particles. For example, in an embodiment using 120/220 silicon carbide grit and low grade CNT starting material, the initial tumbling time was set to 96 hours [range 12-120 hrs; @ 50 rpm 36,000 to 360,000 rotations]. In an embodiment using diamond powder 100,000 grit, CNTs processing times were reduced by approximately a factor of 10:10 hours, 30,000 rotations.

Depending on the source CNT material, the operation of tumbler 32 in terms of grit size, temperature, tumbler speed, pumping speed and processing duration can be altered to mitigate filter clogging that may arise due to unique characteristics, e.g., physical shape and size and/or chemical properties of the particles.

The pores of the filters 50, 52 are not necessarily circular. As the sheared CNTs are released from their bundles, the pump assembly 36 induces a fluid flow in the chamber of tumbler 32 generally perpendicular to the plane in which the meshes of filter cassettes 50, 52 extend. The fluid flow carries the debundled and shortened CNTs downstream towards first filter cassette 50 in the direction of the arrows 39 of FIG. 3. The first and second filter cassettes 50, 52 constitute part of the tumbler 32 and are rotated by rotating system 34. Accordingly, as the sheared CNTs approach the first filter 50, the pores of the filter are in constant movement along a circumferential direction. To improve the likelihood of the axially traveling CNTs penetrating into and passing through the pores of the filters 50, 52, the pores may have an arcuate shape, extending lengthwise substantially circumferentially, as shown in FIG. 4B (not to scale).

While the grit-shearing stage 10 has been described above in connection with a rotational tumbler for agitating the grit particles to cause shearing action, it should be understood that alternative or additional agitation mechanisms and devices may be used, such as stirrers, shakers, etc., to generate grit shearing action.

In an optional embodiment reflected in FIG. 1C, prior to the magnetic phase separation stage 12, fractions withdrawn from compartment(s) 42*b* and/or 44*b* are separately or together subjected to a filtration stage 11. The filtration stage 11 of FIG. 1C may be performed in the tumbler 32 after it has been emptied and cleaned. It should be understood that a separately provided/additional tumbler or other filtration equipment may be used for optional filtration stage 11. According to one implementation of the filtration stage 11, the materials withdrawn from compartment(s) 42*b* and/or 44*b* are reintroduced into the compartment 40*b* of the cleaned tumbler 32, and the rotating mechanism 34 is reactivated. The grit particles may be included or excluded from the compartment 40*b* during the filtration stage 11. Residual metallic catalyst particles will be attracted to the magnet 59 during filtration 11, while the desired CNTs will flow through the meshes 56.

According to the embodiment illustrated in the flowchart of FIG. 1, the magnetic separation stage 12 follows the grit-shearing stage 10. The materials in the compartment(s) 42*b* and/or 44*b* of the downstream cylindrical segment(s) 42 and/or 44 are withdrawn from the tumbler 32 and subjected to the magnetic phase separation stage 12 separately.

Generally, the magnetic phase separation stage 12 operates to substantially separate the debundled, sheared CNT materials from the amorphous carbon and crystalline graphene, tube bundles, catalyst, and grit taken from the tumbler 32 based on magnetic attractive forces and buoyancy. Separation in stage 12 usually is not 100 percent efficient, although enrichment of debundled, sheared CNTs as high as, for example, 100-fold has been estimated for processed, low grade CNT materials.

In certain implementations, magnetic phase separation stage 12 is comparable to a centrifugation operation because of its capability of separating the shortened CNT materials into fractions based on their hydrodynamic size.

Figure 5:
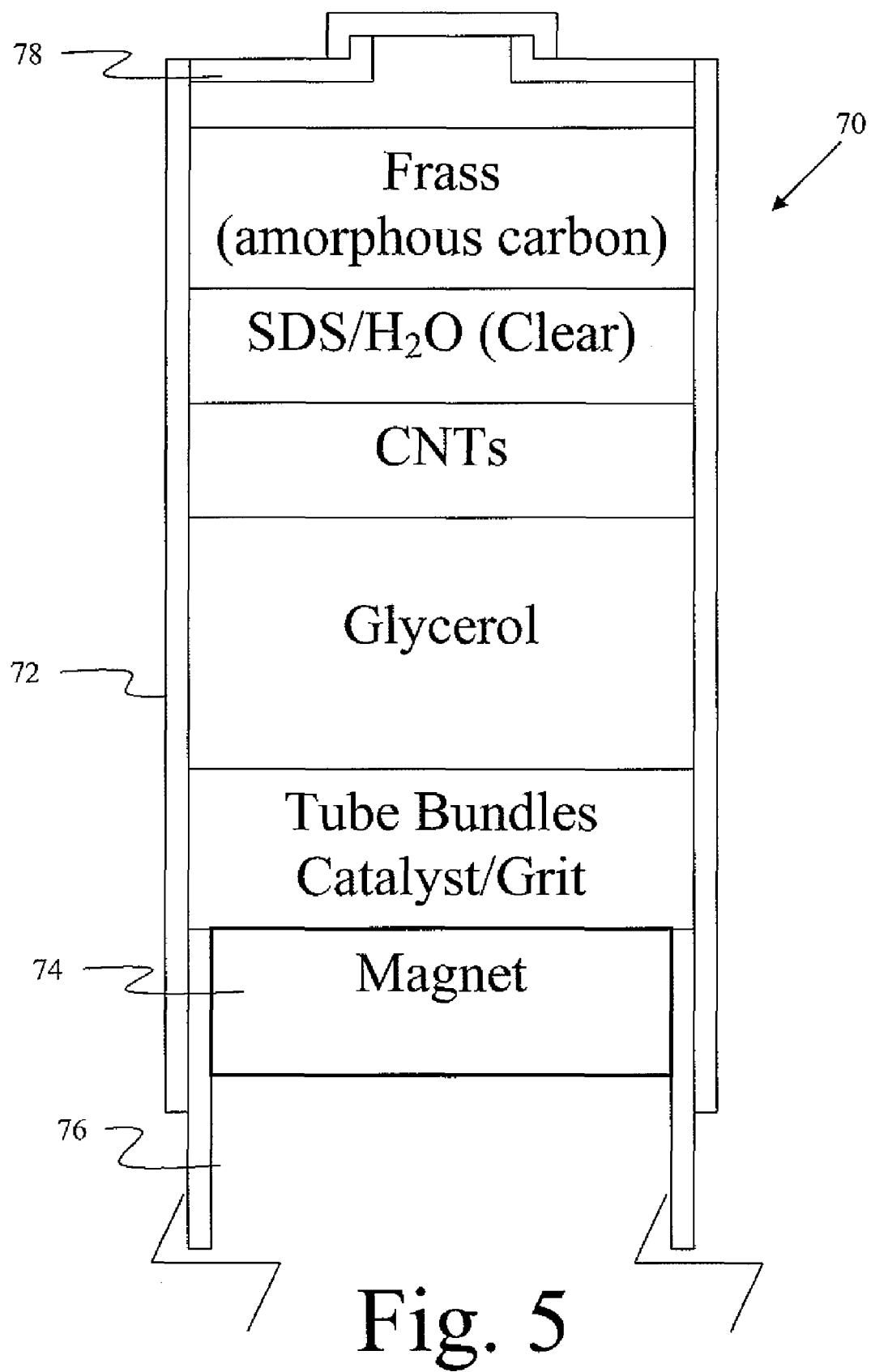
FIG. 5 is a sectional view of an assembly for carrying out a magnetic phase separation step according to an embodiment of the invention.

An exemplary embodiment of an apparatus adapted for the magnetic phase separation stage 12 is illustrated in FIG. 5. It should be understood that other apparatus may be used to carrying out this stage 12. The apparatus is generally designated by reference numeral 70 in FIG. 5 and has the general appearance of a column. The apparatus 70 has a cylindrical outer body 72 standing on its lower end. At least one magnet 74 is disposed below the lower end of the outer body 72. An exemplary magnet 74 is a static neodymium magnet. Other magnetic materials may be used instead or in addition to magnet 74. For example, a non-static magnet, such an electromagnet may be used for the magnetic phase separation stage 12.

The materials withdrawn from the compartment(s) 42b and/or 44b of the cylindrical segment(s) 42 and/or 44 of the tumbler 32 are introduced into the chamber of the apparatus 70 through a port in the upper end closure 78. Glycerol is preferably either pre-loaded into the chamber of the apparatus 70 or added with the extracted fluid of stage 10 through the end closure 78 port. Equal volumetric amounts of 100% glycerol and 1% SDS have been found adequate for conducted tests. Preferably, the glycerol, which has a higher density than the aqueous SDS-solution and therefore sits below the aqueous solution in the apparatus 10, is fed in a relatively small amount to provide a relatively small column height, e.g., about 0.5 to 1 cm. By employing a small glycerol column height in the apparatus 70, the magnetic forces of the magnet 74 are better able to attract solid materials on the opposite side of the glycerol layer.

The chamber contents of the apparatus 70 are allowed to settle without agitation, preferably for 24 to 48 hours, although the time may vary depending upon various factors, including the strength of magnet 74, the amount of glycerol, the temperature of the liquid, and the effectiveness with which CNT byproducts such as catalysts and tube bundles were removed in grit-shearing stage 10. An exemplary neomagnet 72 which has been employed by the inventors generates a 1000-1500 gauss field. The magnetic phase separation can be carried out, for example, at temperatures ranging from about 4° C. to about 37° C. Temperature variation can be used to alter the density of glycerol, which could be used to improve separation properties of different CNT materials, e.g., the density of glycerol could be increased at lower temperature to match the density of MWCNTs, which are denser than SWCNTs, to maintain and/or improve the resolution of this CNT band generated with these CNTs during magnetic phase separation. The magnetic separator may include a temperature controlling device, such as a water jacket or small enclosing temperature regulating box, for controlling temperature and temperature variation. The temperature range for this separation is restricted by the primary solvent (water) and the dispersant properties. While water freezes at 0° C., SDS precipitates at 10-12° C. Substitution of SDS with Lithium Dodecyl Sulfate (LDS), which has a lower precipitation temperature (4° C.), lowers the range of allowable temperature for carrying out operating this phase separation.

The magnetic phase separation stage 12 causes the chamber contents of apparatus 70 to segregate (or more precisely stratify) into a plurality of phases based on magnetic attractive forces and buoyancy. Greater magnetic attractive properties and higher mass of a material (e.g., catalyst particles and grit, respectively) cause it to sink within the chamber, whereas weaker magnetic attractive properties and lower masses cause a material (e.g., amorphous carbon) to rise towards the top of the chamber. The magnetic attractive properties and mass or buoyancy of each material essentially reach equilibrium at a level along the height of the chamber.

FIG. 5 shows an embodiment in which the materials settle and segregate into five (5) major discernible phases. The bottom phase contains metallic catalysts and CNTs. The high buoyancy of the metallic catalysts is offset by the attraction of the magnet 74, which pulls the magnetic catalysts to the bottom of the column. The bottom phase may also contain CNTs in which catalysts are entrapped or remain enjoined, and bundles of carbon nanotubes entangled with each other. The second of the five phases is a glycerol phase. Above the glycerol phase are debundled CNTs in a third phase. It should be understood that the debundled carbon nanotubes are not completely isolated from contaminants in this third phase. Additional steps discussed below may still be carried out for separating amorphous carbon, SDS and glycerol from the CNTs. Above the CNTs is a fourth phase of SDS and water. The top or fifth phase is known as the frass, and contains most of the amorphous carbon and crystalline graphene residue, which is lightest in weight of the chamber contents and has weak magnetic properties.

The third phase with its debundled carbon nanotubes is then separated from the other phases. One particularly useful technique for accomplishing this separation is to freeze the contents of apparatus 70, using an ultra-cold freezer (−80° C.) or submersion in dry ice pellets, then removal of the frozen contents from the cylindrical outer body 72 by driving plunger 76 upward after the end closure 78 has been removed.

The plunger 76 may be made of, for example, high density polyethylene. A cutting or other separating operation may be conducted on the frozen contents to collect the CNT-fraction frozen layer. This cutting or separation operation should be carried out immediately, before thaw is allowed to occur. It has been found that the phases will peal away from one another without requiring a cutting instrument or excessive physical force.

All single-wall carbon nanotubes can be categorized as metallic semi-metals, or semiconducting depending on their conformation. It has been found that one of the potential benefits of the magnetic phase separation step 12 is that the recovered CNT layer has in some cases stratified into a sublayer of CNTs having metallic properties ("metallic CNTs") and a sublayer of CNTs having semiconductive properties ("semiconductor CNTs"). The latter semiconductor CNTs are particularly desirable for many applications, and are difficult to isolate from the metallic nanotubes using conventional processes.

As described above, a stabilizing dispersant (e.g., sodium dodecyl sulfate (SDS)) bonds to the CNT, presumably via van der Waal forces, and/or creates a micelle structure to establish a protective coating around the CNTs. The anionic charge of the SDS facilitates an electrophoresis operation in stage 14 of FIG. 1 for reducing the content of amorphous carbon in the recovered, debundled CNT fraction, as described below. An embodiment of an apparatus for conducting the colloidal electrophoresis step 14 is illustrated in FIG. 6.

Figure 6:
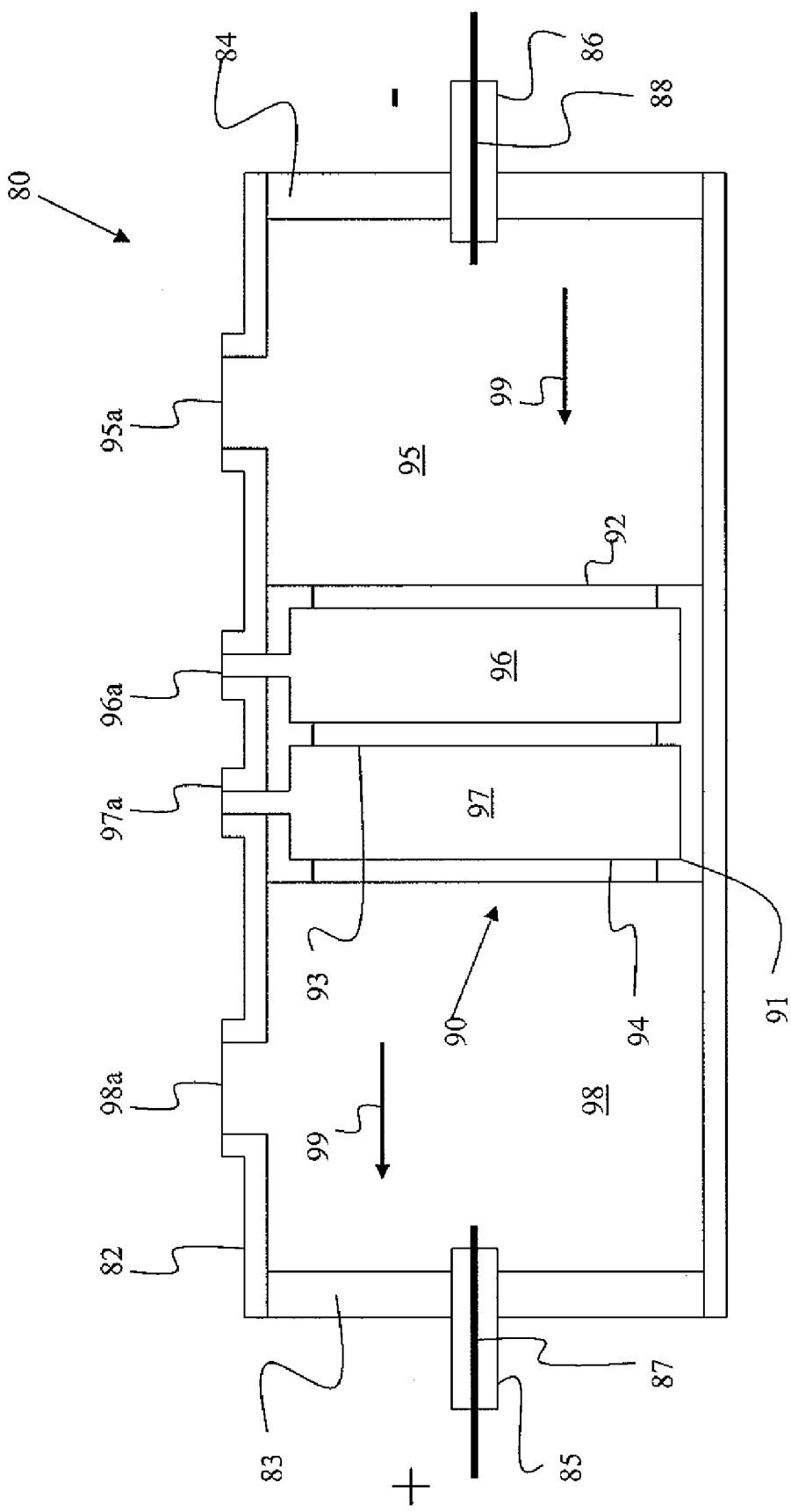
FIG. 6 is a side-sectional view of an apparatus for carrying out an electrophoresis step according to an embodiment of the invention.

Referring to FIG. 6, colloidal electrophoresis apparatus 80 includes a cylindrical housing 82 having end closures 83 and 84 at its opposite ends. The housing 82 and end closures 83, 84 may be made of any suitable material, such as polycarbonate, glass, ceramic, or other materials. End closure 83 includes a swivel joint 85 and a positive electrode 87 centered in the swivel joint 85. Similarly, end closure 84 includes a swivel joint 86 with a negative electrode 88 centered in the swivel joint 86. Although not shown, a rotary system is included to rotate the cylindrical housing 82 about its longitudinal axis. Suitable bearing members may be included for facilitating rotation of the swivel joints 85, 86 relative to the housing 82.

A filter cartridge generally designated by reference numeral 90 is received in the cylindrical housing 82 and generally centered along the length of the housing 82. The filter cartridge 90 is fixedly yet removably attachable to the housing 82 to allow the cartridge 90 to rotate with the housing 82.

The filter cartridge 90 includes an annular membrane mount 91 for retaining a plurality of filter cassettes 92-94. FIG. 7A shows an end view of the filter membrane cassette 92, which includes an outer rim 92a having screw holes 92b, concentric first and second O-rings 92c, 92d, and a filter membrane 92e. As best shown in FIG. 7B, the outer edge of filter membrane 92e passes serpentine-like through mounted are thereby mounted to the O-rings 92c, 92d. Filter cassette 92 optionally also contains access ports 92f, 92g for reasons discussed below. Filter cassettes 93, 94 may be constructed similarly to filter cassette 92.

Upstream (to the right in FIG. 6) from the filter cartridge 90 and the first filter membrane cassette 92 is a first zone or compartment 95. Between the first and second filter cassettes 92, 93 is a second zone or compartment 96 contained within the filter cartridge 90. A third zone or compartment 97 also contained in the filter cartridge 90 is interposed between the second and third filter cassettes 93, 94. A fourth zone or compartment 98 is positioned downstream from the third filter cassette 94 and the filter cartridge 90. The filter cartridge 90 may further include spacer rings between the filter cassettes 92-94, and fasteners (e.g., bolts) for securing the filter cassettes 92-94 to the membrane mount 91. It should be understood that the filter cartridge 90 may contain additional filters to subdivide the chamber of the filter cartridge 90 into more zones or compartments.

First, second, third, and fourth entry/drainage/venting ports 95a, 96a, 97a, 98a extend through the cylindrical housing 82 to zones 95-98, respectively, for permitting the introduction, venting, and removal of material from zones 95-98. Although not shown, each port 95a-98a is provided with a removable cap for establishing a fluid-tight seal. If the cartridge cassettes 92-94 are placed so closely together so as not to create spacing for aligning the entry/drainage/venting ports 96a, 97a with zones 96, 97 directly, then the access ports 92f, 92g of the filter cassettes may be aligned with the ports 96a, 97a for material introduction/removal and venting. The spacing between cartridge cassettes 92-94 may be particularly limited in instances in which the filter cartridge 90 includes additional (e.g., more than three) cartridge cassettes.

In accordance with an experimental embodiment, zones 95-98 are partially filled through their respective ports 95a-98a with an aqueous buffer comprised of 25 mM Trizma™ base (Sigma-Aldrich, St. Louis, Mo.); 190 mM glycine, pH 8.3 which increases the mobility of nanoparticles such as CNTs and amorphous carbon during electrophoresis. An exemplary buffer for this stage is tris-glycine. Zone 96 serves as a loading zone to receive the CNT fraction obtained from stage 12. Amorphous carbon not earlier separated will typically be included in the CNT fraction loaded into zone 96.

The negative charge of the SDS joined to and/or encasing the CNTs and amorphous carbon is attracted to the positive electrode 87 and creates a particle flow (or migration) in the direction of arrows 99. The pores in the filter membranes (e.g., 92c) of filter cassettes 92 and 93 are sized to permit the passage of amorphous carbon, but to intercept and block the passage of the CNTs. The pores of the filter membranes (e.g., 92e) may be, for example, on the order of about 0.1 nm to about 10 nm for carrying out dialysis. Filter cassette 94 may have a filter membrane with an even smaller pore size. In the event that additional filter cassettes are included in the cartridge 90, the pore size of the filter membranes preferably becomes incrementally smaller in a downstream direction, i.e., the direction in which arrows 99 point. The use of multiple membrane sizes allows for further size fractionalization of the CNTs. The first and fourth zones 95, 98 will contain water, buffer, and amorphous carbon, and will be mostly free of the CNTs introduced into compartment 96.

Submicron separation or dialysis may be performed using, for example, PTCE membranes formed by exposing polycarbonate films to collimated, charged particles from a nuclear pile. The charged particles pass through the polycarbonate to leave sensitized tracks. The polymer tracks are then dissolved with an etching solution to form the pores. PTCE membranes are available commercial through, for example, GE Osmonics Labstore of Minnetonka, Minn., which offers 400 nm and 100 nm pore opening products.

During operation, the rotary system (not shown) rotates the electrophoresis apparatus 90 at sufficient speeds to help drive fractionalization. From 10 to 20 rotations per minute (rpms) are exemplary speeds, although speeds outside this range may be employed. The rotary system may operate intermittently, and may change the rotational direction between clockwise and counterclockwise. It has been found that pH levels on the order of 6.8 to 8.8 are particularly advantageous, as are temperatures around room temperature.

It has been found that water may experience electrolysis in this operation, creating hydrogen and oxygen gases in the housing 82. It is useful to intermittently vent the zones 95-98 of hydrogen, oxygen, and any other gases present during stage 14. The venting may take place, for example, during intermissions between rotating periods, e.g., when the rotational direction is reversed.

Figure 8:
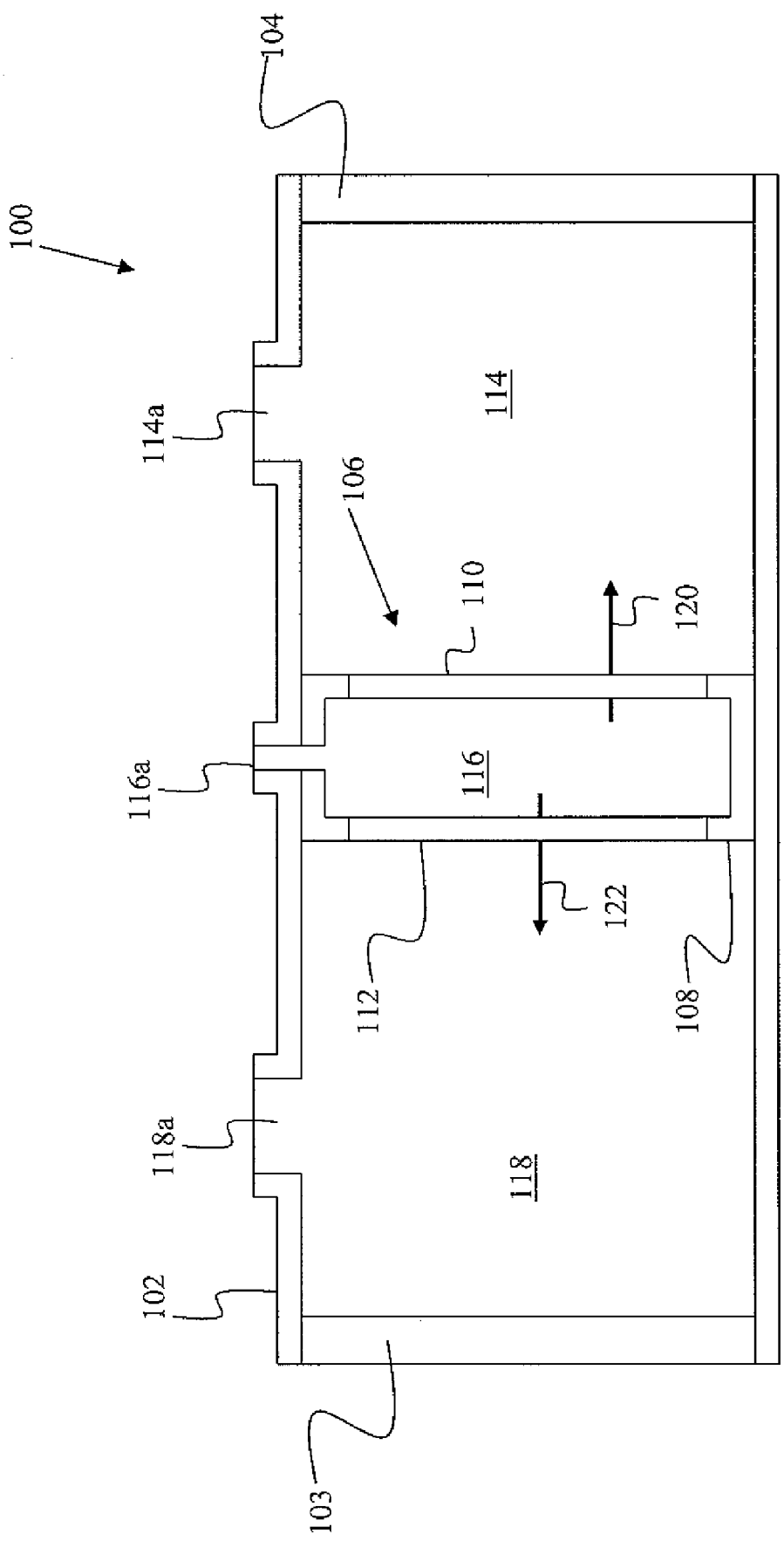
FIG. 8 is a side-sectional view of an apparatus for carrying out a dialysis step according to an embodiment of the invention.

Returning now to the flow diagram of FIG. 1, fractions from one or more of the respective zones 96, 97 are separately or together subjected to dialysis stage 16. Generally, an object of dialysis stage is to at least partially separate the CNTs from the detergent (e.g., SDS) and the buffer (e.g., tris-glycine). An exemplary apparatus for performing dialysis stage 16 is shown in FIG. 8 and generally designated by reference numeral 100. In the process illustrated in FIG. 1, the dialysis stage 16 may include two sub-steps performed consecutively.

The dialysis apparatus 100 shown in FIG. 8 includes a cylindrical housing 102 having end closures 103 and 104 at its opposite ends. The housing 102 and end closures 103, 104 may be made of any suitable material, such as polycarbonate and other materials mentioned herein or otherwise suitable for the intended application. Although not shown, a rotational mechanism or system is included to rotate the cylindrical housing 102 about its longitudinal axis. A rotational device similar to that shown in FIG. 2 and described above may be used.

A filter cartridge 106 is received in the cylindrical housing 102 and generally centered along the length of the housing 102. The filter cartridge 106 includes an annular membrane mount 108 for retaining a plurality of filter cassettes 110, 112. The filter cassettes 110, 112 may have a similar construction as described above with respect to cassettes 92-94 and shown in FIGS. 7A and 7B.

Upstream from the filter cartridge 106 and the first filter membrane cassette 110 is a first zone or compartment 114. Between the first and second filter cassettes 110, 112 is a second zone or compartment 116 generally contained in the filter cartridge 106. A third zone or compartment 118 is positioned downstream from the second filter cassette 112 and the filter cartridge 106. The filter cartridge 106 may further include spacer rings between the filter cassettes 110-102, and fasteners (e.g., bolts) for securing the filter cassettes 110-112 to the membrane mount 108. It should be understood that the filter cartridge 106 may contain additional filters to subdivide the chamber 116 of the filter cartridge 106 into more zones or compartments.

First, second, and third entry/drainage/venting ports 114a, 116a, 118a extend from outside the cylindrical housing 102 to zones 114, 116, 118, respectively, for permitting the introduction, venting, and removal of material from zones 114, 116, 118. Although not shown, removable caps are provided for creating a fluid-tight seal at the ports 114a, 116a, and 118a. If the cartridge cassettes 110, 112 are placed so closely together so as not to create spacing for aligning the entry/drainage/venting port 116a with zone 116 directly, then access ports (see comparable structure of FIG. 7B, reference numerals 92f, 92g) of the filter cassettes may be aligned with the port 116a. The spacing between cartridge cassettes 110-112 may be particularly limited in instances in which the filter cartridge 106 includes additional (e.g., more than two) cartridge cassettes.

In the first "sub-step" of the dialysis stage 16 of FIG. 1, zones 114, 116, 118 are each partially filled through their respective ports 114a, 116a, 118a with water and ethanol for separating the CNTs from the buffer, such as glycine. Zone 116 serves as a loading zone to receive the CNT fraction obtained from zone(s) 96 and/or 97 of the electrophoresis apparatus 80.

To separate the buffer (e.g., tris-glycine) from the CNTs, a relative low concentration of aqueous ethanol may be used. For example, a 20 v/v % to 40 v/v % of ethanol in water is particularly useful for this stage. By starting the dialysis steps with 20-40% EtOH in water, glycine and Tris remain in solution and are dialyzed away from the sample.

Rotation of the dialysis apparatus 100 causes the buffer to be stripped from the CNTs and passed through the membranes of the cassettes 110, 112. The membrane pore (that is, mesh) size is selected to block passage of the CNTs. Pore sizes of 0.1 nm to 10 nm have been found especially useful. The membrane pore sizes of the cassettes 110, 112 may be the same or different from one another.

Dialysis membranes useful in this another other stages described herein include cellulose ester filters, which are commercially available through Spectrum Laboratories, Inc. offering a 50,000 MWCO (estimated <6 nm) membrane and a 5,000 MWCO (estimated <0.1 nm) membrane.

Without necessarily wishing to be bound by any theory, it is believed that the ethanol breaks down the water structure, inhibiting micelle formation and breaking the micelles into smaller units. It should be understood that materials other than ethanol may be selected, such as isopropyl alcohol, methanol, acetonitrile. The dialysis apparatus 100 may be operated at speeds of, for example, about 40 to about 80 rpm, for example, about 50 rpm to about 60 rpm for each sub-step of dialysis stage 16. The dialysis apparatus 100 direction of rotation may be periodically reversed to promote cleaning and reduce clogging of the filters.

In the second "sub-step" of the dialysis stage 16, a higher concentration aqueous ethanol solution is used to separate the CNTs from the SDS detergent. The ethanol solution may contain, for example, about 80 v/v % or more ethanol to water. Generally, the procedures described above for the first "sub-step" are practiced for the second "sub-step" to migrate the SDS through filter membrane cassettes 110, 112 (see arrows 120, 122) as CNTs are retained in center compartment 116. As described above, suitable substitutes for ethanol may be selected, such as isopropyl alcohol, methanol, and acetonitrile.

It should be understood that either of the first or second "sub-steps" of dialysis stage 16 may be excluded. For example, in the embodiment illustrated in FIG. 1B in which colloidal electrophoresis is not practiced, a buffer such as tris-glycine is never introduced into the process. Accordingly, the first "sub-step" of stage 16 may be omitted. (As noted above, colloidal electrophoresis stage 14 optionally may omit a buffer.)

It should be understood that various modifications and alterations to the exemplary embodiments described above are possible and within the purview of a person skilled in the art having reference to this disclosure. For example, agitation spheres may be added to compartment 116 of the dialysis apparatus 100. Rotational movement of the dialysis apparatus 100 causes the agitation spheres to impact the membranes of cassettes 110, 112, imparting a self-cleaning action to reduce or prevent membrane blockage. The agitation spheres are preferably inert with the system. The agitation spheres may be made of acetal, as sold under the trade name Delrin by DuPont. The agitation spheres also may be employed in other stages, such as electrophoresis stage 14. Advantageously, the embodied apparatus and methods of the present invention may be practiced to severe and isolate carbon nanotubes from their metallic catalysts and bundles without requiring chemical or thermal treatment. The destruction of carbon nanotubes is significantly reduced compared to existing processes. Also advantageously, the processes embodied herein are easily scaled up for industrial processing, and do not produce toxic waste products.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A method of harvesting carbon nanotubes, comprising: agitating carbon nanotubes associated with metallic catalysts and having amorphous carbon coatings in an aqueous liquid containing a dispersant and substantially free-flowing grit particles to disassociate the carbon nanotubes from the metallic catalysts, at least partially remove amorphous carbon of the amorphous carbon coatings, and shorten the carbon nanotubes via shearing.

2. The method of claim 1, wherein said agitating comprises rotating the aqueous liquid containing the carbon nanotubes in a tumbler in the presence of the substantially free-flowing grit particles.

3. The method of claim 2, wherein the grit particles comprise diamond.

4. The method of claim 2, wherein the grit particles comprises silicon carbide.

5. The method of claim 2, wherein the dispersant coats the grit particles and the carbon nanotubes.

6. The method of claim 2, wherein the dispersant is anionic.

7. The method of claim 6, wherein the dispersant comprises sodium dodecyl sulfate.

8. The method of claim 2, wherein the tumbler comprises at least one mesh and a magnet, and wherein the method further comprises, concurrently with said rotating, steps of:
  applying a magnetic force to attract the metallic catalysts towards the magnet; and
  horizontally filtering the sheared carbon nanotubes through the mesh to substantially separate the sheared carbon nanotubes from the metallic catalysts that are attracted by the magnetic force towards the magnet.

9. The method of claim 8, further comprising generating a generally axial flow of the aqueous liquid in the tumbler in a direction away from the magnet.

10. The method of claim 2, further comprising subjecting the aqueous liquid containing the carbon nanotubes, the metallic nanoparticles, and the amorphous carbon of the amorphous carbon coatings to a magnetic phase separation stage in which stratified layers of the carbon nanotubes, the amorphous carbon, and the metallic catalysts are developed for separation.

11. The method of claim 10, wherein the magnetic phase separation stage comprises adding glycerol to the aqueous liquid.

12. The method of claim 10, further comprising freezing the aqueous liquid and the stratified layers, and separating the stratified layers from one another.

13. The method of claim 2, further subjecting the aqueous liquid containing the carbon nanotubes to an electrophoresis stage in the tumbler.

14. The method of claim 13, wherein the electrophoresis stage is carried out in a rotating vessel comprising at least one rotating membrane for filtering the carbon nanotubes from the amorphous carbon.

15. The method of claim 2, further comprising:
  subjecting the aqueous liquid containing the carbon nanotubes, the metallic catalysts, and the amorphous carbon of the amorphous carbon coatings to a magnetic phase separation stage in which stratified layers of the carbon nanotubes, the amorphous carbon, and the metallic catalysts are developed for separation; and
  subjecting a stratified layer containing the carbon nanotubes to an electrophoresis stage in a rotating vessel comprising at least one rotating membrane for filtering the carbon nanotubes from the amorphous carbon.

16. The method of claim 15, wherein:
  the electrophoresis stage comprises combining the carbon nanotubes with a buffer, and
  the method further comprises a dialysis stage for separating the buffer from the carbon nanotubes.

17. The method of claim 15, further comprising a dialysis stage for separating the carbon nanotubes from the dispersant.

18. The method of claim 17, wherein the dispersant comprises sodium dodecyl sulfate.

19. A method of harvesting carbon nanotubes, comprising:
  subjecting carbon nanotubes, metallic catalysts and amorphous carbon to a density gradient, magnetic phase separation in which stratified, resolved layers of the carbon nanotubes, the amorphous carbon, and the metallic catalysts are generated to allow for separation.

20. A method of harvesting carbon nanotubes, comprising:
  subjecting a liquid containing a dispersant, carbon nanotubes, and amorphous carbon to an electrophoresis operation in a rotating apparatus containing at least one rotating membrane sized to permit the passage of the amorphous carbon, but to intercept and block the passage of the carbon nanotubes.

21. The method of claim 2, wherein the tumbler is horizontally arranged.

22. The method of claim 21, wherein said rotating is performed at a rate of about 50 to about 100 rotations per minute.

23. The method of claim 1, wherein the grit particles have a size of 254 microns or less.

24. The method of claim 1, wherein said agitating is performed at a temperature at or below 12° C.

25. The method of claim 1, wherein the dispersant encapsulates the grit particles to cushion shearing contact of the encapsulated grit particles against the carbon nanotubes.

* * * * *